United States Patent [19]
Parks et al.

[11] Patent Number: 5,526,481
[45] Date of Patent: Jun. 11, 1996

[54] DISPLAY SCROLLING SYSTEM FOR PERSONAL DIGITAL ASSISTANT

[75] Inventors: Terry J. Parks, Round Rock; David S. Register, Austin, both of Tex.

[73] Assignee: Dell USA L.P., Austin, Tex.

[21] Appl. No.: 524,731

[22] Filed: Sep. 7, 1995

Related U.S. Application Data

[63] Continuation of Ser. No. 97,501, Jul. 26, 1993, abandoned.

[51] Int. Cl.$^6$ ...................................................... G06F 3/14
[52] U.S. Cl. ........................... 395/155; 395/157; 395/161; 345/163
[58] Field of Search .................................... 395/145, 155, 395/157, 164, 166; 345/118, 119, 123, 125, 157, 163

[56] References Cited

U.S. PATENT DOCUMENTS

| | | | |
|---|---|---|---|
| 4,618,858 | 10/1986 | Belch | 395/157 X |
| 4,734,689 | 3/1988 | Kurakake et al. | 345/123 |
| 4,914,607 | 4/1990 | Takanashi et al. | 395/157 X |
| 5,038,138 | 8/1991 | Akiyama et al. | 345/123 |
| 5,142,669 | 8/1992 | Inoue et al. | 395/157 |
| 5,270,694 | 12/1993 | Naimark et al. | 345/123 |

*Primary Examiner*—Raymond J. Bayerl
*Assistant Examiner*—Ruay Lian Ho
*Attorney, Agent, or Firm*—Haynes and Boone

[57] ABSTRACT

A display scrolling system for a personal digital assistant (PDA) which includes a display screen disposed on a top surface of the PDA and a mouse integrated into the bottom surface of the PDA. Documents to be displayed on the screen are stored in a memory of the PDA. The PDA is placed on a work surface such that the mouse is manipulated by rolling the PDA across the surface. The work surface is regarded by the PDA as a virtual display of the document to be displayed on the display screen. As the PDA is rolled across the surface, the mouse generates translation information to a memory controller, which determines the location of the PDA with respect to the virtual document and generates viewport coordinates, which define a portion of the document to be displayed on the display screen. The viewport coordinates are input to a memory controller, which generates memory addresses to the memory indicating the location in the memory of the document portion defined by the viewport coordinates. The addressed document portion is output from the memory to the display screen for display. In this manner, the display screen serves as a window or viewport through which portions of a document corresponding to the virtual display may be viewed.

16 Claims, 3 Drawing Sheets

DISPLAY SCROLLING SYSTEM FOR PERSONAL DIGITAL ASSISTANT

This is a continuation of application(s) Ser. No. 08/097,501 filed on Jul. 26, 1993, now abandoned.

CROSS-REFERENCE TO RELATED APPLICATION

The present application is related to copending application Ser. No. 08/085,219 (Docket No. DC-00417) entitled PERSONAL DIGITAL ASSISTANCE DEVICE WITH COMBINED SCANNER AND FAX MODEM CAPABILITIES, filed on Jun. 29, 1993 assigned to the assignee of the present application and hereby incorporated by reference as if reproduced in its entirety.

TECHNICAL FIELD

The invention relates generally to data processing devices and specifically to a display scrolling system for a personal digital assistance device.

BACKGROUND OF THE INVENTION

The recent shift in the consumer electronics industry from an emphasis on analog technology to a preference for digital technology is largely based on the fact that the former generally limits the user to a role of a passive recipient of information, while the latter is interactive and allows the user to control what, when and how he or she receives and manipulates certain information. This shift in focus has resulted in the development and increasingly widespread use of a digital device generically referred to as a "personal digital assistant" (PDA). PDAs are wireless, hand-held electronic devices that may be connected to a desktop personal computer (PC) or other PDAs via an infrared link. Unlike PCs, which are general purpose devices geared toward refining and processing information, PDAs are designed to capture, store and display information originating from various sources. Additionally, while a certain level of skill and experience is required to use a PC effectively, PDAs are designed with the novice and non-computer user in mind.

PDAs are often described as an electronic alternative to the filofax; however, devices such as electronic books, electronic note takers, personal computers, display telephones and personal communicators may also be embodied as PDAs. Regardless of their embodiment or specialized functions, PDAs' primary functions are to capture and store information, search the stored information efficiently, access and display the results of the search, update the information and reconcile the information with data stored on a PC.

Clearly, the trade off for decreased size and increased portability is a decrease in the capabilities that can be built into a PDA. For example, PDAs have a very small display area that typically is much smaller than the stored document being viewed by the user. It is therefore necessary for PDAs to be equipped with a convenient scrolling mechanism, so that the user is able to view the entire document by scrolling the display up and down or side to side. Most PDAs are equipped with cursor keys for this purpose, with a user being required to press the appropriate key(s) to scroll the screen in the desired direction until the desired portion of the document is displayed on the screen. Alternatively, scroll bars, which are common features of most of the graphical user interfaces (GUIs) available for use on PCs, may be used to manipulate and scroll the display.

One problem with the above scrolling techniques is that, in some implementations, they may be counterintuitive, i.e., the movement of the cursor keys or the scroll bars does not intuitively correspond to the resulting movement of the display. Another problem is that the above techniques enable scrolling in only the X and Y directions, which makes moving about in a large document more difficult and time consuming than would be the case if nonrectilinear scrolling were supported. For example, assuming the document is organized in colurines, similar to a newspaper, a user will likely find it more convenient, as well as more intuitive, to scroll directly to the top of the next column than to scroll over to the next column and then up to the top of the column, or vice versa.

Therefore, what is needed is a scrolling mechanism for use with a PDA which is completely intuitive and which enables a user to scroll in nonrectilinear directions.

SUMMARY OF THE INVENTION

The foregoing problems are solved and a technical advance is achieved by apparatus and method for scrolling the display of a PDA by movement of the PDA over a work surface. The movement scrolls the display as if the data being viewed were on the work surface, thereby creating a "window" or "viewport" metaphor. A mouse device integrated into the bottom surface of the PDA engages the work surface during movement for effecting the scrolling.

In one illustrative embodiment, the PDA comprises a display screen disposed on a top surface thereof and a mouse integrated into a bottom surface thereof. A mouse controller is connected to the mouse for receiving X and Y direction translation data therefrom as the mouse is rolled across a work surface. A memory controller is connected to a memory, in which an image of a document to be displayed on the display screen is stored as a bit map. A display controller is connected to the mouse controller and the memory controller. The display controller is further connected to the display for providing control signals and image data from the memory to the display.

In operation, the PDA is placed on a work surface so that the mouse is in contact with the work surface and may be manipulated by moving the PDA across the surface. The work surface is regarded by the PDA as a virtual display of the bit-mapped image. As the PDA is moved across the surface, the mouse generates X and Y direction translation data, in the form of X, $-X$, Y and $-Y$ signals, to the mouse controller. The mouse controller uses the X and Y direction translation data in combination with a set of virtual display coordinates $(X_D, Y_D)$, which correspond to a previous location of the PDA with reference to the virtual display, to compute viewport coordinates $(X_v, Y_v)$. The viewport coordinates define the portion of the virtual display that is to be instantaneously visible on the display screen. The viewport coordinates are input to the memory controller and used to compute a memory address of the portion of the bit-mapped image to be transmitted to the display screen, via the memory and display controllers. In this manner, the display screen appears as a viewport through which the different portions of the image corresponding to the virtual display are seen by the user.

A technical advantage achieved with the invention is that the viewport metaphor enables scrolling in a manner which is more intuitive than that enabled by cursor keys, scroll bars and the like. Scrolling to a desired location may thus be performed quickly and conveniently.

A further technical advantage achieved with the invention is that it enables nonrectilinear, as well as rectilinear, scrolling, at a selectable velocity and acceleration.

DETAILED DESCRIPTION OF THE PREFERRED EMBODIMENT

Figure 1:
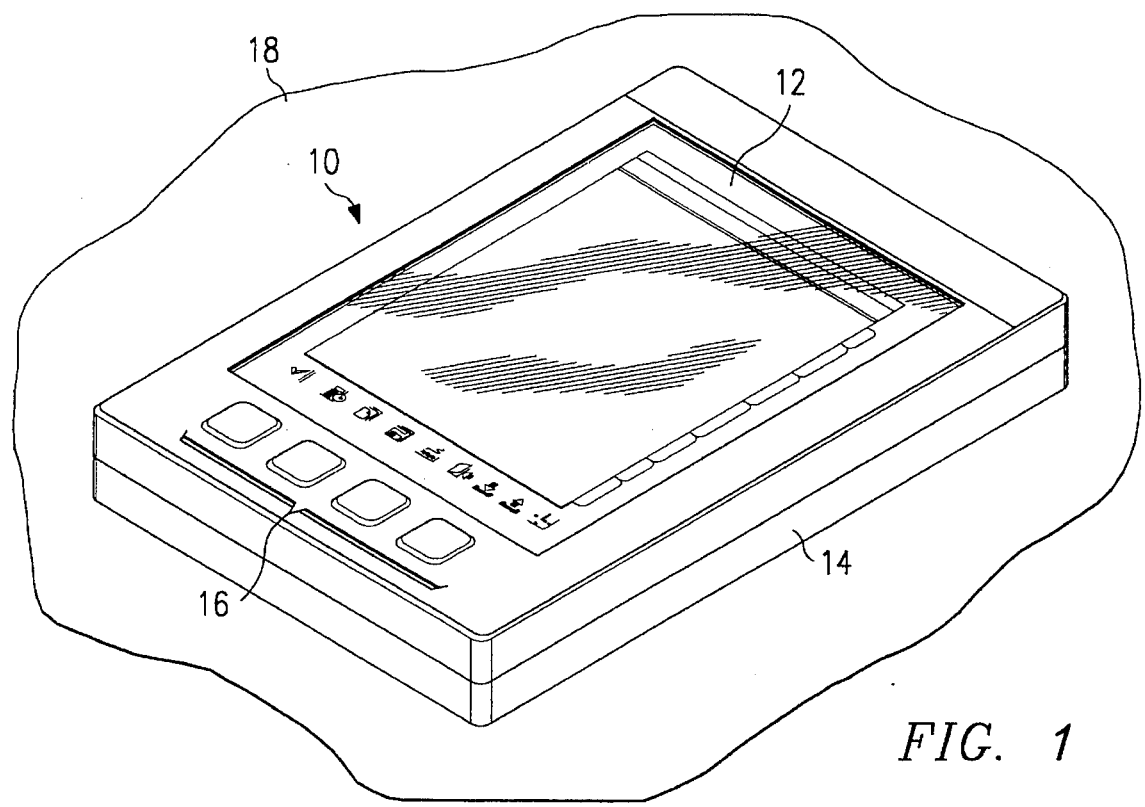
FIG. 1 is a perspective view of a personal digital assistant (PDA) embodying features of the present invention.

FIG. 1 illustrates a personal digital assistant (PDA) 10 embodying features of the present invention. The PDA 10 includes a small display screen 12 supported in a housing 14 for displaying documents stored in a memory (FIG. 3) of the PDA 10. A plurality of control keys 16 are included on the housing 14 for commanding the mode of operation of the PDA 10. At least one of the keys 16 enables a user to view the contents of a document on the screen 12.

As used herein, the term "document" refers to data which is stored in memory as a single data file or set. Because most documents will be too large to be scaled down to a size that would permit display of the entire document on the screen 12, the image displayed represents only a portion of the entire document. As a result, the user will be required to scroll the display of the document to locate and view selected portions of the document. As described below, the invention provides the PDA 10 with a mouse device (FIG. 2) integral with the bottom surface of the housing 14, which mouse interacts with a work surface 18 to scroll the display of the document on the screen 12. As the PDA 10 is moved on the surface 18, the surface 18 is regarded by the PDA 10 as a virtual display of the document being viewed on the screen 12. The screen 12 appears as a window or viewport through which different portions of the document corresponding to the virtual display are seen by the user. This metaphor provides for convenient, intuitive and nonrectilinear scrolling of the document on the screen 12.

Figure 2:
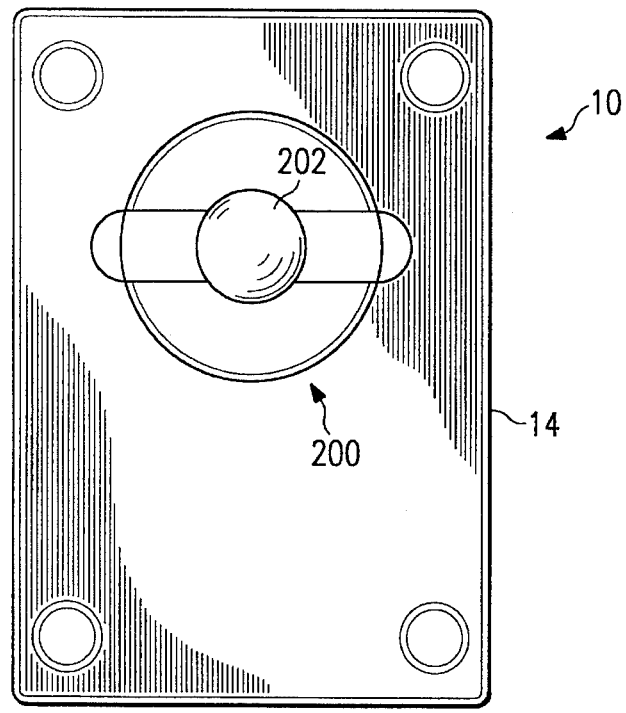
FIG. 2 is a bottom plan view of the PDA of FIG. 1.

FIG. 2 illustrates a mouse 200 built into the housing 14 on the underside of the PDA 10. The mouse 200 provides X and Y direction translation information to a memory controller (FIG. 3) within the PDA 10 as the mouse 200 is rolled across the surface 18, as will subsequently be described in detail. A ball 202 of the mouse 200 frictionally engages the surface 18 to convey the translation information in the form of four signals X, –X, Y, and –Y. The details of construction of a mouse device and use thereof in generating signals indicative of the direction and amplitude of movement of the mouse with respect to X and Y axes are well known and therefore are not discussed further. Alternative mouse devices may be utilized, such as those incorporating optical and other detector configurations, as desired.

Figure 3:
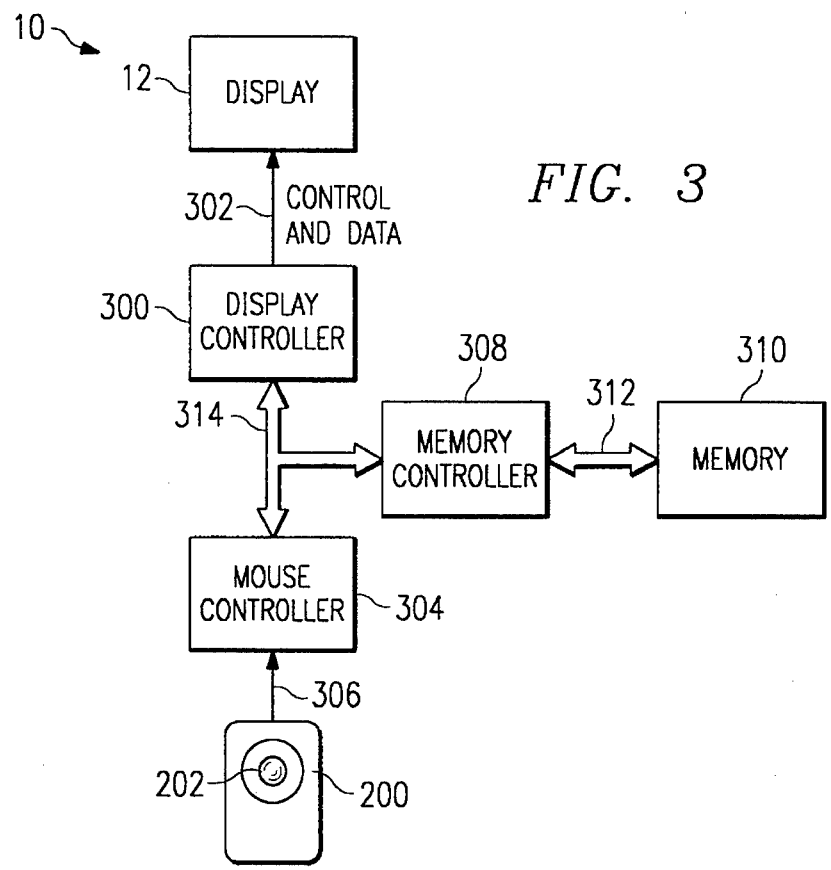
FIG. 3 is a schematic block diagram of the PDA of FIG. 1.

FIG. 3 illustrates a block diagram of the PDA 10. As previously indicated, the PDA 10 includes a display screen 12, a mouse 200 and a ball 202. A display controller 300 is connected to the display screen 12, via a bus 302, for transmitting control and image data signals thereto. A mouse controller 304 is connected to the mouse 200 via a bus 306 for receiving X and Y direction translation data, e.g., X, –X, Y, and –Y signals, from the mouse 200. The X and Y direction translation dam provides information regarding the direction and amplitude of the movement of the PDA 10 with respect to the surface 18. A memory controller 308 is connected to a memory 310 via a bus 312 and is interconnected with the display controller 300 and the mouse controller 304 via a bus 314. The PDA 10 also includes a processor and other conventional circuitry (not shown), which components are well known and therefore not described further.

In general, the size of a bit-mapped document to be displayed on the screen 12 will greatly exceed the display capabilities of the screen 12. Therefore, to view a large document, the user may move the PDA 10 across the work surface 18, as if the surface 18 is a virtual display of the entire document and the display screen 12 is a viewport through which a portion of the virtual display is visible. The mouse 200 on the bottom of the PDA 10 keeps track of the position of the PDA 10 with respect to its initial location and transmits translation data coordinates $X_o$, $Y_o$ to the mouse controller 304. As will be described in detail with reference to FIGS. 4, 5a and 5b, the mouse controller 304 computes display coordinates $X_D$, $Y_D$, which are referenced to X and Y axes imposed on the work surface 18 across which the PDA 10 is moved, i.e., the virtual display of the entire document. The $X_o$, $Y_o$ and $X_D$, $Y_D$ coordinates are then used by the mouse controller 304 to compute a set of viewport coordinates $X_v$, $Y_v$, which define the portion of the virtual display that is instantaneously visible on the screen 12. The viewport coordinates are provided to the memory controller 308, which computes memory address of the portion of the bit-mapped document to be displayed on the screen 12 based on the viewport coordinates. Image data is output from the memory 310, via the memory controller 308, to the display controller 300 for generating an image of the selected portion of the document on the screen 12.

Figure 4:
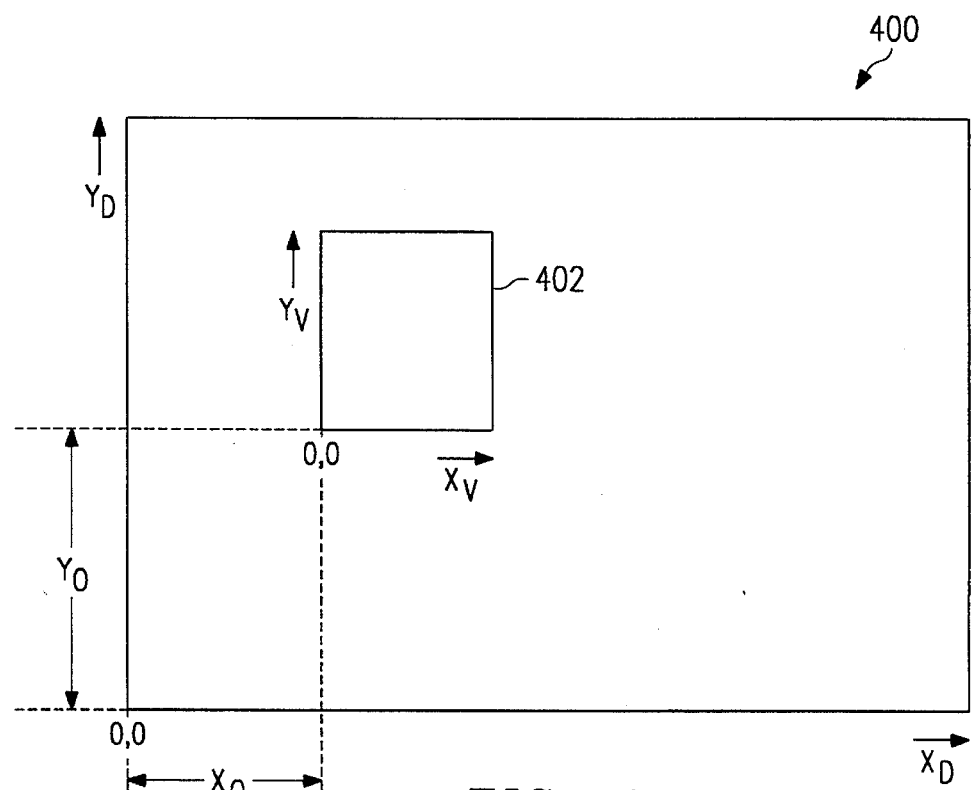
FIG. 4 is a block diagram illustrating the operation of the PDA of FIG. 1.

FIG. 4 illustrates the operation of the PDA 10 with respect to a virtual display 400 of a document stored in the memory 310. The display 400 is defined by virtual display coordinates $X_D$, $Y_D$. A viewport 402 is defined by viewport coordinates $X_v$, $Y_v$, and represents the portion of the larger virtual display 400 that is instantaneously visible on the screen 12. As the PDA 10 is moved over the work surface 18, which is regarded by the PDA 10 as the virtual display 400, the mouse 200 transmits translation data to the mouse controller 304 via the bus 306, which data is indicative of the amplitude and direction of movement of the PDA 10 with respect to its previous display 400 position. The data from the mouse 200 enables the mouse controller 304 to compute coordinates $X_o$, $Y_o$, which coordinates correspond to an instantaneous viewport coordinate offset. As further described with reference to FIG. 5b, the following transformations convert the virtual display coordinates to viewport coordinates:

$$X_v = X_D + X_o$$

$$Y_v = Y_D + Y_o$$

Figure 5A:
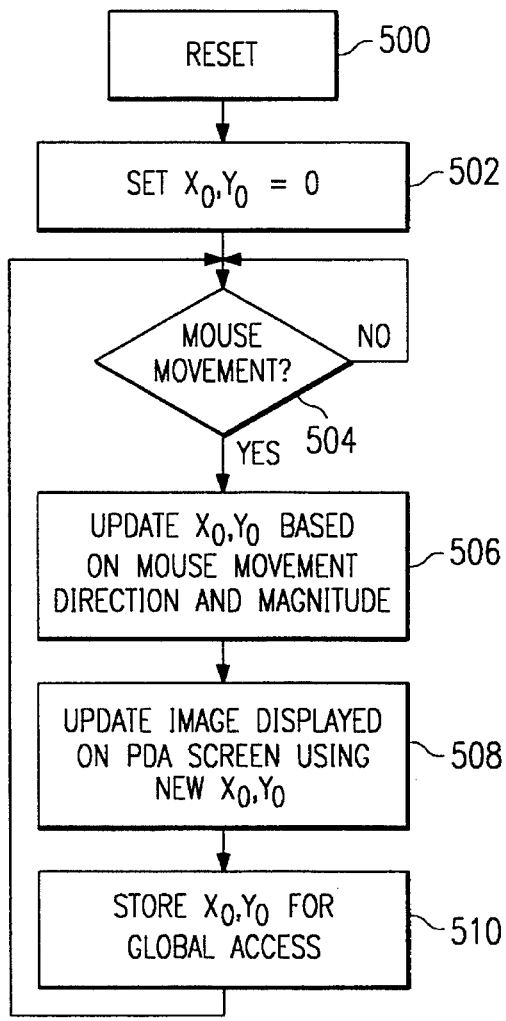
FIG. 5a is a flowchart of an asynchronous software module executed by the mouse controller of FIG. 3.
Figure 5B:
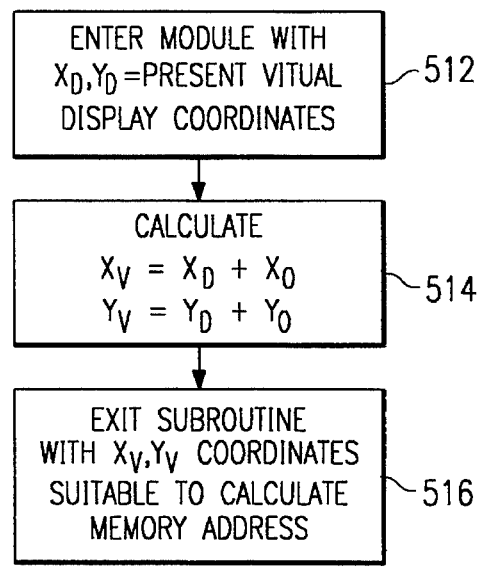
FIG. 5b is a flowchart of a synchronous software module executed by the mouse controller of FIG. 3.

FIGS. 5a and 5b illustrate logic instructions implemented by the memory controller 308 for converting the virtual display coordinates to viewport coordinates. The logic requires two cooperating software modules including an asynchronous module (FIG. 5a), which is executed asynchronously responsive to any movement of the mouse 200, and a synchronous module (FIG. 5b), which is called under software control by an application program being executed by the processor (not shown) of the PDA 10 to manage display of the portion of the virtual display 400 defined by the viewport 402 on the display screen 12. Both the asynchronous and synchronous modules are stored in the memory 310 of the PDA 10. The execution of the logic instructions for the display and scrolling of a document as described herein is initiated by appropriate user actuation of one or more of the keys 16 (FIG. 1).

Referring to FIG. 5a, execution of the asynchronous module begins in step 500 when the PDA 10 is reset, which may occur, for example, when the PDA 10 is turned on or when a new document is selected for display. In step 502, variables corresponding to the coordinates $X_o$, $Y_o$ are set to zero (0), so that initially, the origin of the $X_D$, $Y_D$ axes coincides with the origin of the $X_v$, $Y_v$ axes. In step 504, a determination is made whether the mouse 200 has moved. If not, execution remains at step 504 until the mouse 200 has moved. Otherwise, execution proceeds to step 506. In step 506, the $X_o$, $Y_o$ variables are updated based on the direction and magnitude of the movement of the mouse 200. In step 508, the image displayed on the display screen 12 is updated using the updated $X_o$, $Y_o$ variables from step 506. In step 510, the updated $X_o$, $Y_o$ variables are stored in the memory 310 for global access, e.g., access by other application programs. Execution then returns to step 504, to await further movement of the mouse 200.

Referring to FIG. 5b, execution of the synchronous module begins in step 512 with the virtual display coordinates stored as variables $X_D$, $Y_D$. The synchronous module is called under software control by an application program, e.g., when data is to be written to the display screen 12 by the application program. In step 514, viewport coordinates are calculated using the current values of the $X_D$, $Y_D$ variables and the $X_o$, $Y_o$ variables and are stored as variables $X_v$, $Y_v$. In step 516, the synchronous module is exited and execution returns to the application program. In addition, the values represented by the $X_v$, $Y_v$ variables are output by the mouse controller 304 to the memory controller 308 for calculating the address of the bit-mapped image to be displayed on the screen 12.

Thus, the present invention enables a user to scroll directly to any portion of a stored document by simply placing the PDA 10 on the work surface 18, such that the mouse 200 is in contact with the surface 18, and moving the PDA 10 across the surface 18 as if the surface 18 is a virtual display of the document and the screen 12 is a viewport through which a portion of a virtual display may be viewed. Scrolling is accomplished at a velocity and acceleration selected by the user. The invention further permits nonrectilinear movement through the document and additionally, is more intuitive than other scrolling mechanisms, as it enables a user to view a document as if it were a real document disposed on the work surface 18. For example, when reading a newspaper, a user generally proceeds directly to the beginning of the next line of print when finished with a previous line of print and to the beginning of the next column when finished reading a column. As described above, the PDA 10 operates in exactly the same manner, except that the newspaper is a virtual display which is viewed through a viewport, rather than a physical object on the surface 18.

It is understood that the present invention can take many forms and embodiments. The embodiments shown herein are intended to illustrate rather than to limit the invention, it being appreciated that variations may be made without departing from the spirit or the scope of the invention. For example, the mouse 200 may be implemented using mechanical or opto-mechanical motion sensors or any other available mouse technology. Further, the mouse 200 may comprise two separate mouse devices to enable X, Y and yaw coordinates to be computed and used in displaying a portion of the document, as more fully described in the related copending application referenced above.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. An integrated personal digital assistant (PDA) supportable on a work surface for viewing a document stored in a memory of said PDA, said PDA comprising a housing having top and bottom surfaces and further comprising:

a display screen integrated into said top surface of said housing and coupled to said memory for displaying at least a portion of said document;

a motion indicator integrated into said bottom surface of said housing for engagement with said work surface for providing information regarding movement of said PDA with respect to said work surface; and a controller coupled between said motion indicator and said memory for receiving said movement information from said motion indicator and generating memory coordinates indicating said document portion to be output from said memory for display on said display screen.

2. The PDA of claim 1 wherein said document portion corresponds to a location of said display screen relative to said work surface, said work surface representing a virtual display of said document stored in said memory.

3. The PDA of claim 1 wherein said motion indicator comprises a trackball.

4. The PDA of claim 1 in which said work surface represents a virtual display of said stored document;

wherein said controller computes virtual display coordinates with reference to X and Y direction axes imposed on said work surface, said virtual display coordinates representing a current location of said display screen relative to said virtual display;

wherein said controller computes offset coordinates with reference to said X and Y direction axes responsive to receipt of said movement information, said offset coordinates representing a change in position of said display screen from said current location; and wherein said controller computes said memory coordinates by adding said virtual display coordinates and said offset coordinates.

5. The PDA of claim 4 further comprising:

a memory controller coupled between said memory and said controller for receiving said memory coordinates from said controller and generating memory addresses to said memory, wherein said memory addresses indicate a location in said memory at which said document portion is stored.

6. The PDA of claim 5 wherein said memory coordinates comprise viewport coordinates imposed on said virtual display for defining a portion of said virtual display instantaneously visible on said display screen at a given time.

7. The PDA of claim 1 wherein said movement information comprises X and Y direction translation information.

8. A personal digital assistant (PDA) comprising a housing having top and bottom surfaces, said PDA being supportable on a work surface and further comprising:

a memory for storing data;

a display screen integrated into the top surface of said PDA housing and coupled to said memory for displaying a portion of said data;

a trackball integrated into the bottom surface of said PDA housing for engagement with said work surface, wherein said trackball generates information regarding movement of said PDA with respect to said work surface;

a controller coupled between said mouse device and said memory for receiving said movement information from said trackball and generating memory coordinates therefrom; and a memory controller connected to said memory and to said controller for receiving said memory coordinates from said controller and generating data memory addresses to said memory, said data memory addresses corresponding to said memory coordinates and indicating a location in said memory of said data portion to be output from said memory to said display screen for display thereon.

9. The PDA of claim 8 wherein said data comprises a bit-map image of a document.

10. The PDA of claim 8 wherein said PDA is moved across said work surface to select said data portion for display on said display screen.

11. The PDA of claim 8 wherein said work surface represents a virtual display of said data;

wherein said controller computes virtual display coordinates with respect to X and Y direction axes imposed on said work surface, said virtual display coordinates representing a current location of said display screen relative to said virtual display;

wherein said controller computes offset coordinates with reference to said X and Y direction axes responsive to receipt of said movement information, said offset coordinates representing a change in position of said display screen from said current location; and wherein said controller computes said memory coordinates by adding said virtual display coordinates and said offset coordinates.

12. The PDA of claim 8 wherein said movement information comprises X and Y direction translation information.

13. The PDA of claim 12 wherein said trackball detects movement of said PDA in said X direction and generates a first signal indicative thereof and detects movement of said PDA in said Y direction perpendicular to said X direction and generates a second signal indicative thereof.

14. A method of using an integrated personal digital assistant (PDA) supported on a work surface for viewing a document stored in a memory of said PDA, said PDA comprising a housing having top and bottom surfaces and having a display screen integrated into said top surface of said housing and a trackball integrated into said bottom surface of said housing for engagement with said work surface, the method comprising:

moving said PDA across said work surface;

detecting said movement of said PDA and generating movement information responsive to said detection;

computing virtual display coordinates with reference to X and Y axes imposed on said work surface; and computing memory coordinates from said movement information and said virtual display coordinates, said memory coordinates defining a portion of said document for display by said PDA.

15. The method of claim 14 further comprising:

generating memory addresses from said memory coordinates, wherein said memory addresses indicate a location in said memory of said document portion defined by said memory coordinates; and issuing said memory addresses to said memory, said memory outputting said document portion to a display screen.

16. The method of claim 15 wherein said generation of movement information further comprises:

generating a first signal indicative of an amplitude of said PDA movement in an X direction; and generating a second signal indicative of an amplitude of said PDA movement in a Y direction perpendicular to said X direction.

* * * * *